United States Patent
Wu

(10) Patent No.: US 9,393,659 B2
(45) Date of Patent: Jul. 19, 2016

(54) CUTTING-OFF SAW WITH SAFETY PROTECTION DEVICE

(75) Inventor: Mingting Wu, Shanghai (CN)

(73) Assignee: KEN HOLDING CO., LTD., Shanghai (CN)

( * ) Notice: Subject to any disclaimer, the term of this patent is extended or adjusted under 35 U.S.C. 154(b) by 64 days.

(21) Appl. No.: 13/816,454

(22) PCT Filed: Dec. 30, 2011

(86) PCT No.: PCT/CN2011/084989
§ 371 (c)(1),
(2), (4) Date: Apr. 18, 2014

(87) PCT Pub. No.: WO2013/091263
PCT Pub. Date: Jun. 27, 2013

(65) Prior Publication Data
US 2014/0216227 A1    Aug. 7, 2014

(30) Foreign Application Priority Data

Dec. 19, 2011    (CN) ...................... 2011 2 0533087 U

(51) Int. Cl.
*B23Q 11/06* (2006.01)
*B27G 19/02* (2006.01)

(52) U.S. Cl.
CPC ............... *B23Q 11/06* (2013.01); *B27G 19/02* (2013.01); *Y10T 83/7693* (2015.04)

(58) Field of Classification Search
CPC .... B23Q 11/06; B27G 19/02; Y10T 83/7693; Y10T 403/581; Y10T 403/58
USPC .............................. 83/478, 58, 397, 485–489; 403/348–349, 315, 319, 321
See application file for complete search history.

(56) References Cited

U.S. PATENT DOCUMENTS

| 512,529 | A | * | 1/1894 | Aichele | ................... | B64G 1/645 |
| | | | | | | 403/321 |
| 3,920,147 | A | * | 11/1975 | Hiatt | ..................... | A47J 45/072 |
| | | | | | | 16/425 |
| 5,893,311 | A | | 4/1999 | Huang | | |
| 6,644,884 | B2 | * | 11/2003 | Gledhill | ............... | E05C 17/045 |
| | | | | | | 403/315 |

(Continued)

FOREIGN PATENT DOCUMENTS

| CN | 1931489 A | 3/2007 |
| CN | 201128029 Y | 10/2008 |

(Continued)

*Primary Examiner* — Sean Michalski
*Assistant Examiner* — Liang Dong
(74) *Attorney, Agent, or Firm* — Muncy, Geissler, Olds & Lowe, P.C.

(57) ABSTRACT

A cutting-off saw with a safety protection device, including a base; a support arm arranged on the base; a cutting blade coupled to the support arm by a driving head; a fan-shaped fixed guard and a movable guard configured to enclose the cutting blade and can be combined into a single disc; an extension arm coupled to a top portion of the support arm; the movable guard coupled to one end of a guard connecting rod; the other end of the guard connecting rod formed into an arc-shaped elbow and coupled to a stop button and the extension arm. An arc-shaped bayonet having a radian matching with that of the arc-shaped elbow of the guard connecting rod is arranged on a lower portion of the stop button. It ensures that the movable guard will never be turned upwards during the operation of loading or unloading a workpiece.

1 Claim, 4 Drawing Sheets

(56) References Cited

U.S. PATENT DOCUMENTS

| | | |
|---|---|---|
| 2006/0266190 A1 | 11/2006 | Saitou |
| 2008/0202303 A1 | 8/2008 | Imamura |
| 2010/0275755 A1* | 11/2010 | Cox ........................ B23Q 11/06 83/471.3 |

FOREIGN PATENT DOCUMENTS

| | | |
|---|---|---|
| CN | 201855998 U | 6/2011 |
| CN | 201969945 U | 9/2011 |
| JP | 2009107103 A | 5/2009 |

* cited by examiner

CUTTING-OFF SAW WITH SAFETY PROTECTION DEVICE

TECHNICAL FIELD

The present invention relates to a cutting-off saw with a safety protection device, which is mainly used to ensure that a movable guard will not be accidentally turned upwards during the operation of loading or unloading a workpiece to further protect the operator, and pertains to the technical field of tools.

BACKGROUND

A common cutting-off saw essentially includes: a base for placing a workpiece to be cut; a support arm hingedly supported on the base; a driving head mounted on the support arm; and a cutting blade that is able to rotate driven by the driving head. When the support arm is pressed down after the driving head has been started to rotate the cutting blade, the cutting blade will cut the workpiece placed on the base in a desired way.

In order to ensure the operational safety, an upper portion of the cutting blade is enclosed by a fixed guard and a lower portion is enclosed by a movable guard. The structures of a movable guard are respectively disclosed in the patents Nos. ZL200720043502.8 and U.S. Pat. No. 5,893,311. In a typical structure, a geometric center of the fan-shaped movable guard forms a revolute pair with a spindle of the cutting blade; one end of a guard connecting rod is hinged on the body of the movable guard at a predetermined position whilst a straight channel oriented along the center line of the guard connecting rod is formed near the other end of the guard connecting rod; the straight channel forms a sliding pair with a pivot screw disposed near the hinge point of the support arm.

Therefore, during a cutting process, when the support arm is pressed down, the above-mentioned connecting rod mechanism will lead the movable guard to pivot and gradually hide in the fixed guard so as to expose the cutting blade to enable it to cut the workpiece. Moreover, when the support arm is lifted up, the above-mentioned connecting rod mechanism will lose its pulling force on the movable guard and the movable guard will hence pivot in a reverse manner and return to a position fitting with the fixed guard, making the cutting blade completely shielded and avoiding accidental damages caused by an exposed cutting blade. In addition, as the cutting blade is a consumable part, when one needs to replace the cutting blade, the guard connecting rod can be lifted up to move the pivot screw near the hinge point of the support arm to the inner end of the straight channel formed in the guard connecting rod, thus allowing the movable guard to be turned upwards to facilitate the replacement of the cutting blade.

However, the existing structure of the above-mentioned movable guard only has a unidirectional constraint design, that is: when the support arm is pressed down and while the pivot screw near the hinge point of the support arm is located at the outer end of the straight channel formed in the guard connecting rod, the connecting rod mechanism severs to compulsorily drive the movable guard to turn upwards; but there is no constraint to prevent the pivot screw from moving to the inner end of the straight channel; as a result, there is still a possibility for a movable guard with such a current structure to be inadvertently turned upwards and lead to an accident. Thus, strictly speaking, this design cannot meet the requirement that "cutting-off saws shall be so designed that the movable guard will not be accidentally turned upwards during the operation of loading or unloading a workpiece", specified in part 2 of "particular requirements for cutting-off saws".

In order to address the aforementioned issue, patents Nos. ZL201020281095.6 and ZL201120033928.1 proposed two technical solutions. In the one disclosed by ZL201020281095.6, a locating pin mechanism is used to restrict the movement of the guard connecting rod. The structure includes a connecting rod assembly consisting of an extension arm, a support arm, an extension-arm connecting rod and a connecting-rod pivot screw. The extension arm is mounted on the support arm. One end of the extension-arm connecting rod in which a straight channel is formed is coupled to the movable guard through a guard connecting rod. The connecting-rod pivot screw is inserted through the straight channel and is located near the other end of the extension-arm connecting rod. The extension-arm connecting rod can rotate around this connecting-rod pivot screw. The locating pin mechanism includes the guard connecting rod and a trough formed in the fixed guard. One end of the guard connecting rod is coupled to the support arm. The connecting-rod pivot screw inserts through the guard connecting rod, the extension-arm connecting rod and the trough formed in the fixed guard, thereby joining these three members together. Therefore, the connecting-rod pivot screw may slides in the trough and thus forms a sliding pair.

The technical solution disclosed by ZL201120033928.1 uses an additional screw to replace the locating pin mechanism of the above-mentioned solution to restrict the movement of the guard connecting rod. In this technical solution, the aforementioned pivot screw is referred to as a first locating screw and the additional screw as a second locating screw. The structure is as follows: an extension arm is mounted on a support arm; the first locating screw is fixed on the extension arm and the second locating screw is fixed near to the first locating screw; one end of the guard connecting rod is hinged with the movable guard near its rotation center; the other end of the guard connecting rod is formed into an arc-shaped elbow; the arc-shaped elbow is hooked on the first locating screw.

Although both the above two technical solutions are capable of restricting the movement of the guard connecting rod to a certain extent and hence reducing the possibility for the movable guard to be accidentally turned upwards during the operation of loading or unloading a workpiece, these structures fail to completely restrict the guard connecting rod. That is, it is still possible for the guard connection rod to slide to accidentally turn upwards the movable guard, and therefore has not completely eliminated the potential safety hazard.

SUMMARY OF THE INVENTION

An objective of the present invention is to provide a cutting-off saw with a safety protection device, which is capable of preventing a movable guard from being accidentally turned upwards during the operation of loading or unloading a workpiece without harming the normal performance of the movable guard, so as to further ensure the safety of the operator.

To achieve the above objective, the cutting-off saw with a safety protection device provided by the present invention includes a base for placing a workpiece to be cut; a support arm is arranged on the base; a cutting blade is coupled to the support arm by a driving head; a fan-shaped fixed guard and a movable guard are configured to enclose the cutting blade and can be combined into a single disc; an extension arm is coupled to a top portion of the support arm; the extension arm is coupled to one end of a guard connecting rod by a pivot screw; the other end of the guard connecting rod is formed into an arc-shaped elbow and coupled to the movable guard and is further inserted through the fan-shaped fixed guard and hooked on the pivot screw, wherein one end of the arc-shaped elbow of the guard connecting rod is coupled to a stop button by the pivot screw. An arc-shaped bayonet having a radian matching with that of the arc-shaped elbow of the guard connecting pod is arranged on a lower portion of the stop button.

This invention has the beneficial effects as follows: it ensures that the movable guard will never be turned upwards during the operation of loading or unloading a workpiece by definitely locking the guard connecting rod, thereby eliminating the potential safety hazard in the prior art that it is possible for the movable guard to be turned upwards and hence lead to an accident during the above said operation; and it has a simple structure and may be easily assembled.

DETAILED DESCRIPTION

The present invention will be further described and specified below with reference to accompanying drawings and preferred embodiments.

Figure 1:
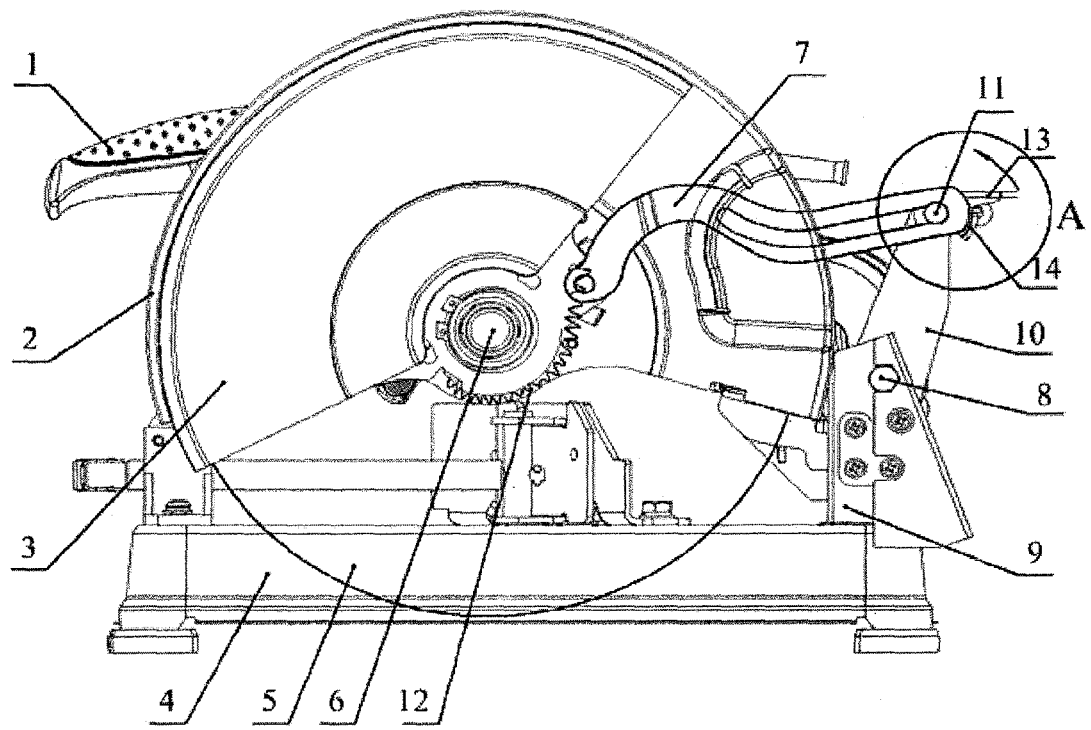
FIG. 1 is a schematic diagram of the structure of a cutting-off saw with a safety protection device in a cutting state.
Figure 2:
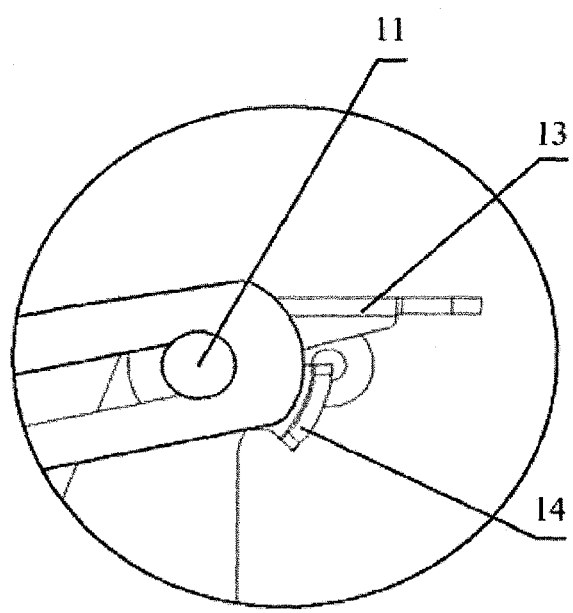
FIG. 2 is a partially enlarged schematic diagram of the structure of the cutting-off saw with a safety protection device in a cutting state.
Figure 3:
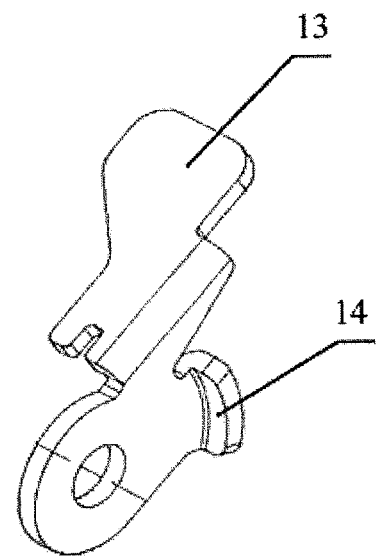
FIG. 3 is a schematic diagram of an arc-shaped bayonet.

The invention provides a cutting-off saw with a safety protection device. As shown in FIG. 1, the cutting-off saw essentially includes: a base 4 for placing a workpiece to be cut; a support arm 9 hinged and supported on the base 4 by an articulating shaft 8; a driving head mounted on the support arm 9; and a cutting blade 5 that is able to rotate driven by the driving head. An extension arm 10 is fixed on the support arm 9 and a pivot screw 11 is disposed in a top portion of the extension arm 10. The cutting blade 5 is enclosed by a fan-shaped fixed guard 2 and a movable guard 3, which can be combined into a substantially complete disc. A geometric center of the movable guard 3 forms a revolute pair with a rotation center of the cutting blade 5, namely, a center of a shaft 6 of the driving head. One end of a guard connecting rod 7 is hinged on the body of the movable guard 3 at a position near the rotation center of the movable guard, and the other end of the guard connecting rod 7 is formed into an arc-shaped elbow. An arc-shaped channel is formed in the arc-shaped elbow. Referring to FIG. 2, the pivot screw 11 that inserts through a hole formed in one end of the extension arm 10 joins together the four members, namely, the guard connecting rod 7 and hence the movable guard 3, the extension arm 10 and a stop button 13, thereby coupling the guard connecting rod 7 and the stop button 13 to the extension arm 10 so as to form revolute pairs. The structure of the stop button 13 is shown in FIG. 3. An arc-shaped bayonet 14 which has a radian matching with that of the arc-shaped elbow of the guard connecting rod 7 is arranged in a lower portion of the stop button 13.

Figure 4:
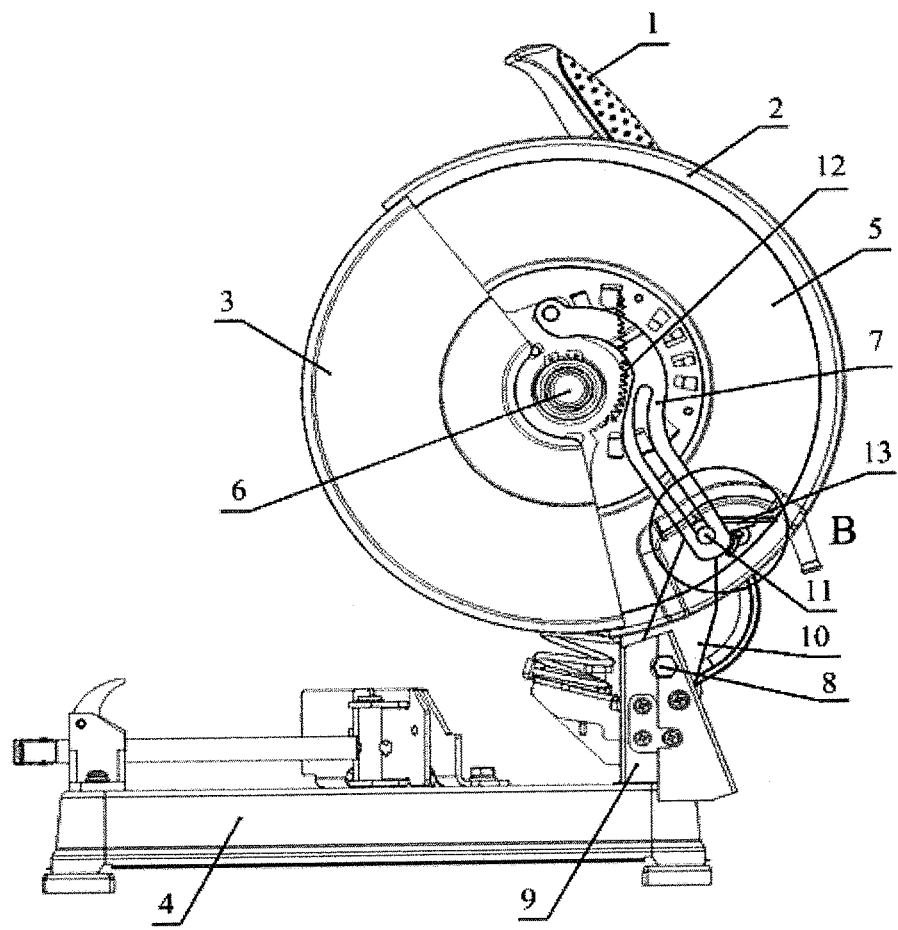
FIG. 4 is a schematic diagram of the structure of a cutting-off saw with a safety protection device in a non-cutting state.
Figure 5:
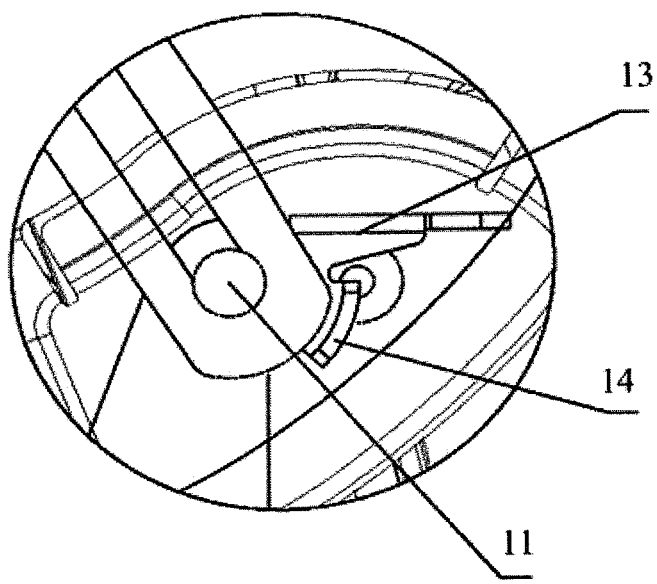
FIG. 5 is a partially enlarged schematic diagram of the structure of the cutting-off saw with a safety protection device in a non-cutting state.

When the handle 1 is pressed down, the pivot screw 11 is kept in its position and the guard connecting rod will lead the movable guard 3 to turn upwards, thus making the cutting blade 5 contact with the workpiece, as shown in FIG. 1. When the handle 1 is lifted up, the movable guard 3 will be drawn by a spring 12 and gradually turn downwards until the cutting blade 5 is wholly enclosed by the fixed guard 2 and the movable guard 3, as shown in FIG. 4. No matter in the cutting state shown in FIG. 1 or in the non-cutting state shown in FIG. 4, the stop button 13 always stays at the same position shown in FIG. 2 or FIG. 5, and therefore, the guard connecting rod 7 can only pivot about the pivot screw 11 restricted by the pivot screw 11 and the stop button 13. Further, as the arc-shaped elbow of the guard connecting rod 7 is definitely locked by the arc-shaped bayonet 14 of the stop button 13, the pivot screw 11 cannot slide along the channel in the guard connecting rod 7. Furthermore, as the radian of the arc-shaped bayonet 14 matches the radian of the arc-shaped elbow, the above described state of being definitely locked is very stable and the pivot screw 11 will never slide due to vibration, weak fixation or loosening of the screw. As a result, it is ensured that the movable guard will never be turned upwards during the operation of loading or unloading a workpiece when replacing workpieces.

Figure 6:
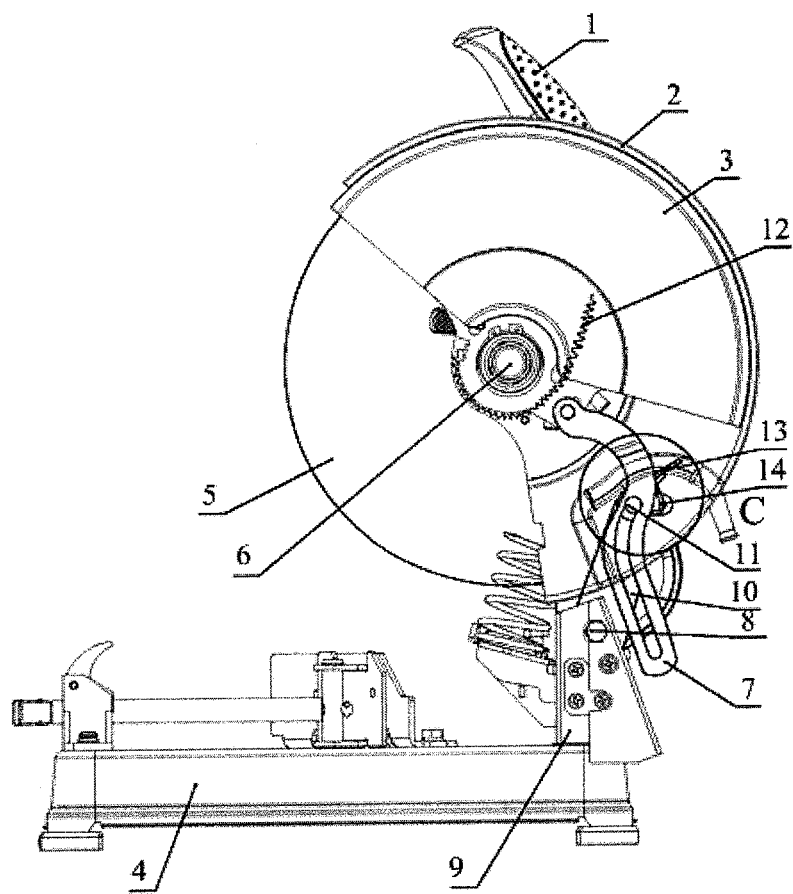
FIG. 6 is a schematic diagram of the structure of a cutting-off saw with a safety protection device in a state for replacing a cutting blade.
Figure 7:
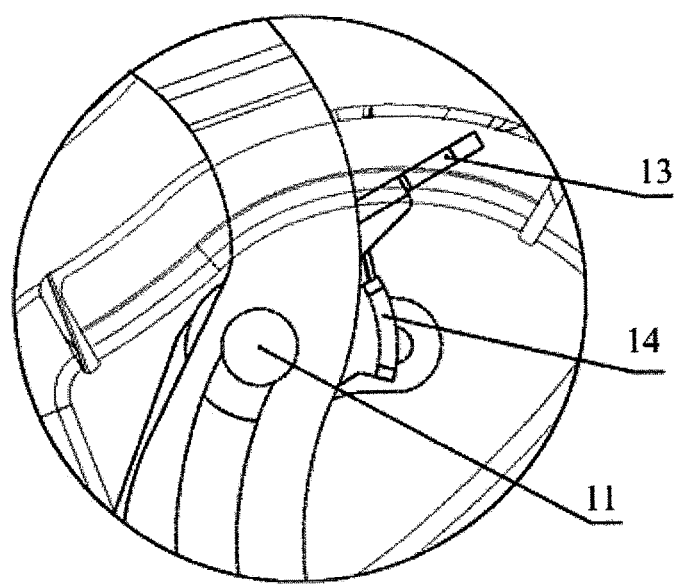
FIG. 7 is a partially enlarged schematic diagram of the structure of the cutting-off saw with a safety protection device in a state for replacing a cutting blade.

When to replace the cutting blade, once the stop button 13 is lifted upwards (i.e., in the direction indicated by the arrow in FIG. 1) slightly by a finger, the arc-shaped bayonet 14 will no longer be in a matching position with regard to the arc-shaped elbow, thus losing the constraint on the guard connecting rod 7 and enabling the pivot screw 11 to slide along the channel in the guard connecting rod 7. After that, as shown in FIG. 6, when the guard connecting rod 7 is pulled until the pivot screw 11 in the channel of the guard connecting rod 7 slides to the other end of the channel, the movable guard 3 will be turned upwards as desired, leaving a space for a cutting blade to be moved in or out to facilitate the replacement of the cutting blade. After the replacement, one only needs to move back the stop button 13 to its rest position, so that it can once again constrain the relative sliding between the pivot screw 11 and the guard connecting rod 7 and ensure the safety.

What is claimed is:

1. A cutting-off saw with a safety protection device, comprising a base for placing a workpiece to be cut, a support arm being arranged on the base, a cutting blade being coupled to the support arm by a driving head, a fan-shaped fixed guard and a movable guard being configured to enclose the cutting blade and can be combined into a single disc, an extension arm being coupled to a top portion of the support arm, the extension arm being coupled to a first end of a guard connecting rod by a pivot screw, a second end of the guard connecting rod being coupled to the movable guard, wherein the first end of the guard connecting rod is formed into an arc-shaped elbow and is coupled to a stop button by the pivot screw, wherein an arc-shaped bayonet having a radian matching with a radian of the arc-shaped elbow of the guard connecting rod is arranged on a lower portion of the stop button, and an arc-shaped channel is formed in the arc-shaped elbow in which the pivot screw can slide such that when the arc-shaped elbow of the guard connecting rod is locked by the arc-shaped bayonet of the stop button, the pivot screw is not permitted to slide along the arc-shaped channel in the guard connecting rod, and when the stop button is lifted upwards, the pivot screw is allowed to slide along the arc-shaped channel in the guard connecting rod.

* * * * *